(12) United States Patent  (10) Patent No.: US 7,972,177 B2
Richter  (45) Date of Patent: Jul. 5, 2011

(54) SLIDE CLIP

(75) Inventor: Michael Richter, Schalksmuehle (DE)

(73) Assignee: Lumberg Connect GmbH, Schalksmuehle (DE)

( * ) Notice: Subject to any disclaimer, the term of this patent is extended or adjusted under 35 U.S.C. 154(b) by 100 days.

(21) Appl. No.: 12/434,697

(22) Filed: May 4, 2009

(65) Prior Publication Data

US 2009/0275231 A1  Nov. 5, 2009

(30) Foreign Application Priority Data

May 3, 2008  (DE) .......................... 10 2008 022 051

(51) Int. Cl.
*H01R 13/68* (2006.01)
(52) U.S. Cl. ............... 439/620.26; 439/620.29; 136/244
(58) Field of Classification Search ............. 439/620.26, 439/620.27, 620.29, 535; 136/244, 293
See application file for complete search history.

(56) References Cited

U.S. PATENT DOCUMENTS

| 7,291,036 | B1 * | 11/2007 | Daily et al. ................... | 439/487 |
| 7,444,743 | B2 * | 11/2008 | Feldmeier et al. .............. | 29/748 |
| 2005/0022859 | A1 | 2/2005 | Nass .............................. | 136/251 |
| 2006/0289053 | A1 * | 12/2006 | Nieleck et al. ................ | 136/244 |
| 2008/0190477 | A1 * | 8/2008 | Hattori .......................... | 136/246 |
| 2009/0309689 | A1 * | 12/2009 | Pavlovic et al. .............. | 337/187 |

FOREIGN PATENT DOCUMENTS

| DE | 102006012665 | 10/2006 |
| DE | 102006019210 | 10/2007 |

* cited by examiner

*Primary Examiner* — Hien Vu
(74) *Attorney, Agent, or Firm* — Andrew Wilford

(57) ABSTRACT

These objects are attained by a box for connecting an output conductor of a solar panel with a feed cable and that has a flat base mountable on the solar panel and having a first opening for the feed cable and a second opening for the output conductor. A contact mounted on a conductor of the feed cable has a flat connection region extending parallel to the base. A contact clip secures the conductor to the connection region.

11 Claims, 6 Drawing Sheets

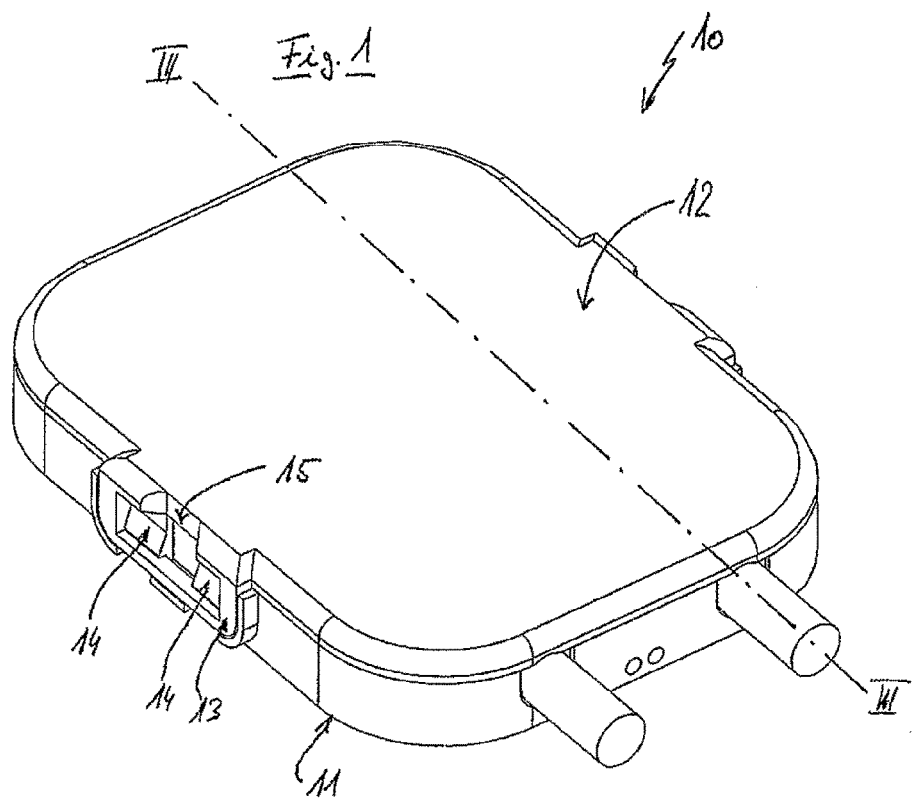
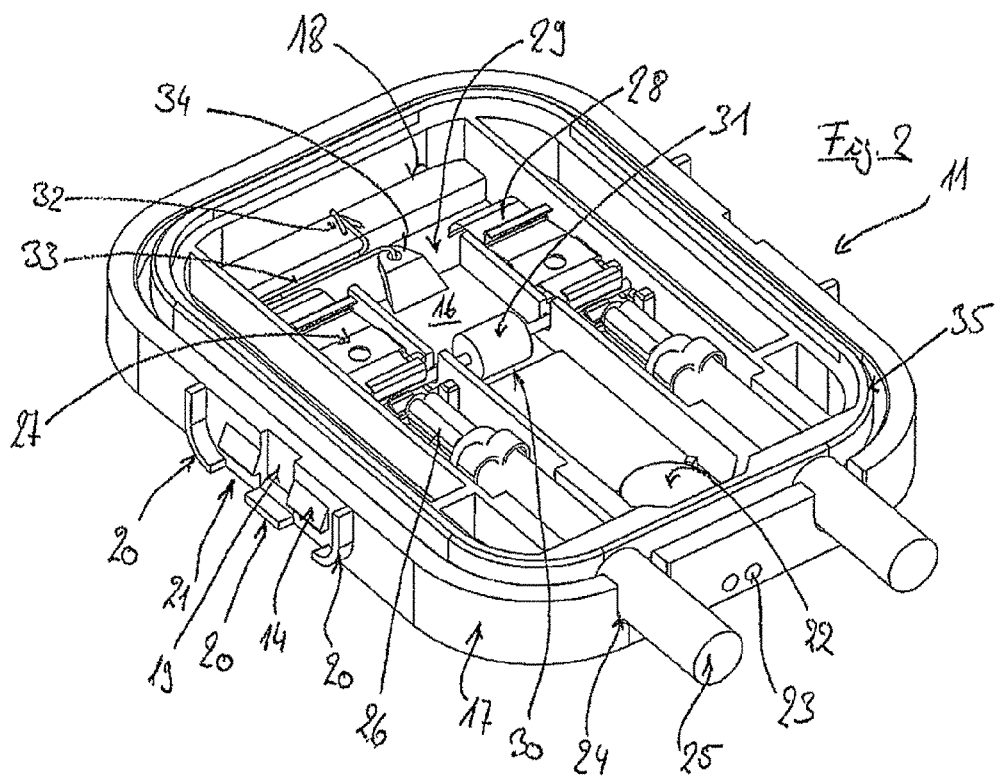

SLIDE CLIP

FIELD OF THE INVENTION

The present invention relates to a connection box. More particularly this invention concerns a connection box for a solar panel.

BACKGROUND OF THE INVENTION

A standard solar-panel connection box of this type has a base that is mounted directly on a face of a solar panel and formed with a first opening for a solar-panel output cable and a second opening for a feed cable that supplies electricity generated by the solar panel into an electrical network. It has connectors inside the connection box that form a good electrical connection between the connection cable and the feed cable and optionally also connect to circuit elements that have to do with conduction of the electricity from the solar panel into the electrical network. A connection box of this type is known from prior art through DE 10 2005 024 644, in which solar-panel output cables as well as feed cables are connected to each other through contact clips and terminals.

What is particularly disadvantageous with the above-described prior art is that additional tools are required to connect the connection cables. These are used to spread the standard connection terminals so as to be able to insert the connecting leads, usually designed as strip-like foil output conductors, into the terminals. Circuit elements, such as bridge diodes, are optionally installed in a separate procedure and electrically linked by means of additional contacts.

OBJECTS OF THE INVENTION

It is therefore an object of the present invention to provide an improved connection box for a solar panel.

Another object is the provision of such an improved connection box for a solar panel that overcomes the above-given disadvantages, in particular that significantly simplifies electrically connecting the connection cable, feed cable, and optionally provided circuit elements.

SUMMARY OF THE INVENTION

These objects are attained according to the invention by a box for connecting an output conductor of a solar panel with a feed cable and that has a flat base mountable on the solar panel and having a first opening for the feed cable and a second opening for the output conductor. A contact mounted on a conductor of the feed cable has a flat connection region extending parallel to the base. A contact clip secures the conductor to the connection region.

A circuit element, which can be within the scope of the invention can be any component affecting the transmission of electricity generated by the solar panel to the electricity network, such as bridge diodes or active and passive control elements, can also be held in the box.

With this system, therefore, the contact is fixed, for instance crimped, to the feed cable. The solar-panel conductor, which can be a ribbon or tape conductor, is clamped between confronting faces of the clip and contact.

According to the invention, only one contact clip is installed to ensure the electrical connection between contact and connection cable, the contact clip overlaying the contact and connection cables at their overlap region. This simplifies the coupling of connection cable and feed cable both for manual and machine-made connections since no special tools are required.

In an especially preferred embodiment, provision is made whereby the contact has an insertion region for a contact section of a circuit element, in particular, if the insertion region is overlain by the contact clip and secures the inserted contact section. In this development of the invention, one and the same connector, specifically the contact clip, is used both to make the electrical connection of the connection conductor or cable and feed cable as well as the connection of the circuit element, in particular, of a bridge diode. This significantly simplifies making an electrical connection between the components particularly in the case of automated production.

The contact is part of a strip-conductor structure. Alternatively, it is possible for the contact to be a contact stud or tongue. The contact clip is formed with retaining arms that grip underneath the contact. A preferred embodiment is characterized in that the retaining arms and/or the contact form guide surfaces that provide a snap-in of the contact clip on the contact.

Aside from making an electrical connection between connection cable, feed cable, and any optionally provided circuit elements, due to the contact clip's simply being mounted on the opposing overlap region, it is advantageous for manual production of such a connection if the contact clip can slide on the contact, provision being made that in an open position an insertion gap is formed between the contact and the contact clip for insertion of the connection cable. This ensures that the contact clip is securely gripped by the contact.

The actual clamping force that holds the connection cable on the contact is applied, however, only by moving the contact clip to the closed position. This solution also has significant advantages in terms of servicing and repair. The secured contact can be released manually by simply moving the contact clip to its open position.

The above-described advantages also apply in particular in an embodiment in which in the open position of the contact clip the insertion region for the contact section of the circuit element is free and the slide-on contact clip in the closed position secures the contact section within the insertion region.

In order to restrict the sliding path and reliably define the open position and the closed position, stops are provided on the contact for limiting travel of the clip. Thus the contact has stops that hold the contact clip in a position that in which it makes the electrical connection between connection cable and feed cable and/or the contact region of the circuit element, in other words, in particular, stops that define the closed position.

The pressing force making an electrical connection of the contact clip can be implemented especially easily when the contact clip is made of elastically deformable conductive material, e.g. copper-plated steel, bowed in a bridge-like fashion toward its longitudinal extent and rests by its ends of the end regions lying within the longitudinal extent on the connection cable so as to secure the electrical connection, provision being made that the contact clip is longitudinally slidable on the contact.

BRIEF DESCRIPTION OF THE DRAWING

The above and other objects, features, and advantages will become more readily apparent from the following description, reference being made to the accompanying drawing in which:

FIG. 1 is a perspective view of a connection box for a solar panel;

FIG. 3 is a sectional view of the connection box along section line III-III in FIG. 1;

SPECIFIC DESCRIPTION

Figure 2:
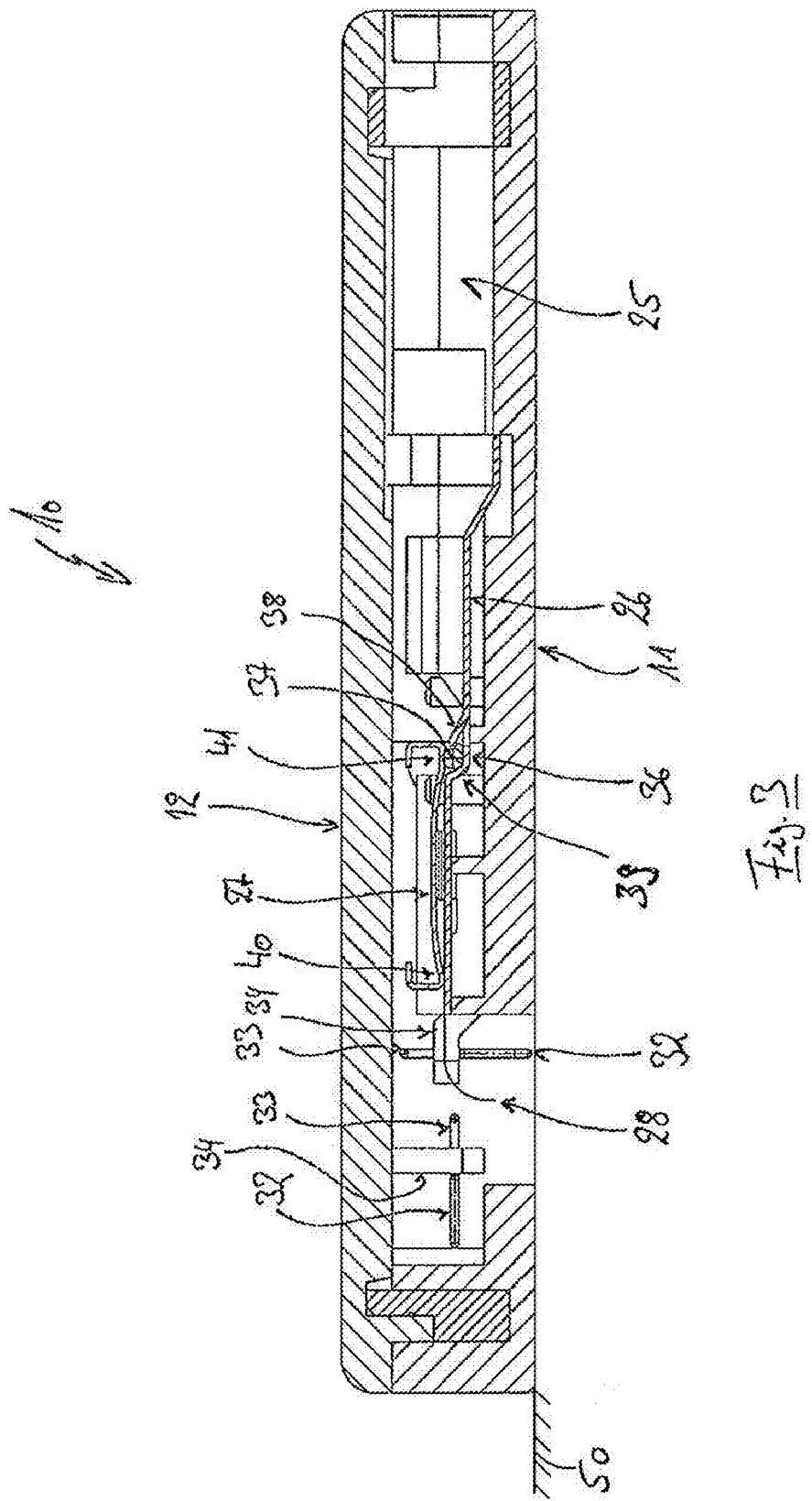
FIG. 2 is a perspective view of the base of the connection box of FIG. 1.
Figure 4:
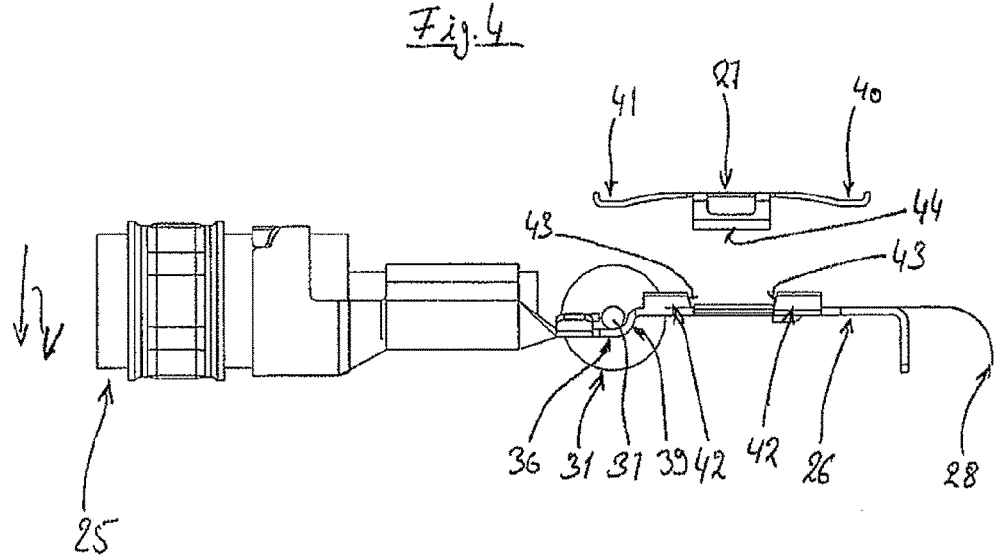
FIG. 4 is a side view of the connection region of the connection cable and the feed cable without the contact clip.
Figure 5:
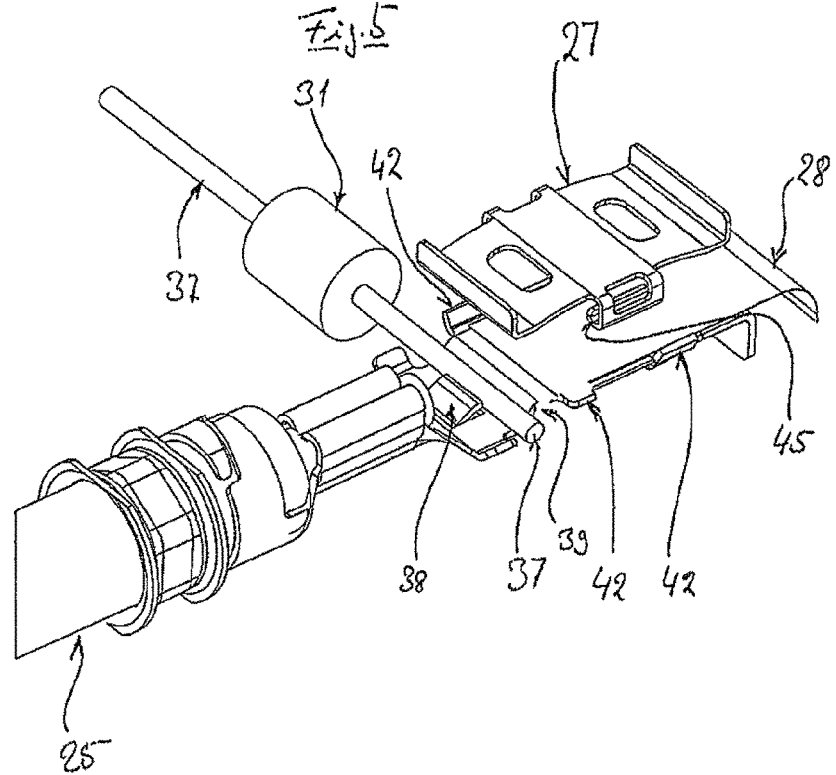
FIG. 5 is a perspective view of the connection region shown in FIG. 4.
Figure 6:
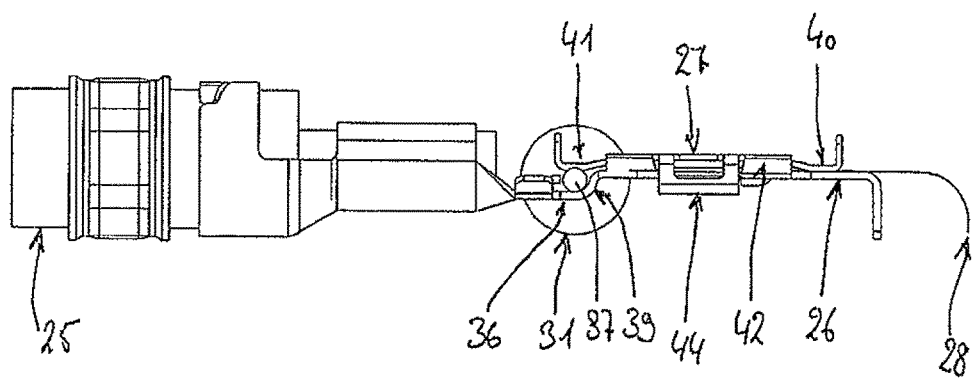
FIG. 6 is a side view of the connection region shown in FIG. 4 with the contact clip installed.
Figure 7:
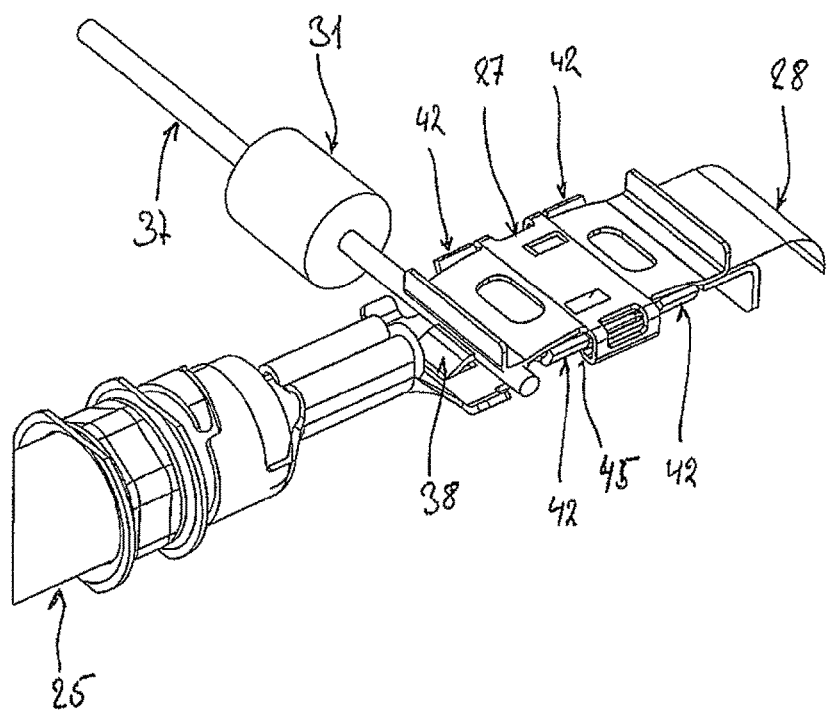
FIG. 7 is a perspective view of the connection region shown in FIG. 6.

As seen in the drawing a connection box 10 has a base 11 that is closable by means of a flat and generally planar removable cover 12 that is formed with locking lugs 13 at opposite edges that extend downward toward the base 11 and can fit laterally over projecting tabs 14 formed on the base 11. Formations 15 allow the locking lugs 13 to be spread by a tool to release the cover 12 from the base 11 of the connection box 10. (The references to "up" and "down" being purely for convenience of description, since the box is often mounted inverted on the generally downwardly facing back face of a solar panel.)

An annular wall 17 projects upward from the outer periphery of a generally rectangular and planar floor 16 of the base 11 toward the cover 12 to define therewith a compartment 18 that accommodates various components connectors 10. The outside surface of the wall 17 is unitarily formed with the wedge-shaped locking tabs 14. A tool groove 19 between these locking tabs 14 is aligned with the cover-side tool formation or groove 15. The guide ridges 20 delimit the space inside which the locking tabs 14 can fit to ensure correct positioning of the locking lugs 13 relative to the locking tabs 14. Tool-engagement formations 21 are provided between the guide ridges 20 in alignment with the locking tabs 14 so a spreading tool can release the locking connection between the locking lugs 13 and the locking tabs 14 by prying them apart.

A vent 22 in the compartment 18 connects its interior through vent holes 23 in the wall 17 with the outside environment when the connection box 10 is closed. This prevents condensation and also positive or negative pressures inside the box 10.

The wall 17 has two cable holes 24 through which feed cables 25 are routed into the connection box 10. The conductors of these cables 25 are connected to contacts 26 to which contact clips 27 are crimped. The contact clips 27 first of all ensure good electrical connection between the connection cables or flat conductor strips 28 extending from the solar panel shown schematically at 50 and routed through an opening 29 in the floor 16 into the connection box 10 and the feed cables 25. Second, they ensure a good electrical connection between the feed cables 25 and a circuit element 30 bridging these cables 25, here a bridge diode 31. A tether line 33 provided with a barb 32 engages eyelets 34 on the wall 17 of the base 11 and a rim of the cover 12 to maintain the cover 12 permanently attached to the base 11. A flexible seal 35 that projects upward above the wall 17 toward the cover 12 seals the compartment 18 from the exterior environment when the connection box 10 is closed.

As shown in FIG. 3 the contact clip 27 is provided between the contact 26 and the connection conductor 28. The contact clip 27 is longitudinally bowed and downwardly concave. The contact 26 forms a channel-like insertion region 36 in which one lead 37 of the circuit element 31 rests. The seat 36 is delimited on one side by a pushed-out lug 38 formed adjacent the connection region and by an offset 39 of the contact 26 on the other side. On its side away from the feed cable 25 after the offset 39 is the common overlap region of the connection conductor 28 and the contact 26.

Due to the bowing of the contact clip 27 that extends which bowing is oriented longitudinally, only end sections 40 and 41 of the contact clip 27 form the contacting means. At the same time, the contact end 40 facing away from feed cable 25 presses the connection conductor 28 against the contact 26. The contact end 41 closer to the feed cable 25 is above the seat 36 and presses down the lead 37.

FIGS. 4 through 7 show a first example for making an electrical connection between the contact clip 26 and the connection conductor 28. In this embodiment, the contact clip 27 is snap-mounted at the overlap region of the connection conductor 28 and the contact clip 26, and in the installed state is fixed on the contact 26.

Within the overlap region, the contact 26 is formed on its longitudinal edges with two longitudinally spaced pairs of transversely spaced guide tabs 42 that engage around and embrace the contact clip 27 to each longitudinal side of its center. Inner end faces 43 of the tabs 42 on each longitudinal edge flare in a V-shape. In its central region oriented longitudinally at both longitudinal sides, the contact clip 27 is formed on each longitudinal edge with a snap-in-locking formation 44 that is roughly hook-shaped so that it can grasp the contact 26 and hole it with their outer arms 45. These formations 44 each fit between two of the tabs 42.

In order to make an electrical connection between the contact 26 and the connection conductor 28 at the contact end 40, and to make an electrical connection between the lead 37 and the contact 26 in the seat 36 at the contact end 41, the contact clip 27 is placed onto the contact clip 26 in direction V. The diverging end faces 43 of the guide tabs 42 ensure the centering of the snap-in locking formations 44 and the correct alignment of the contact ends 40 and 41. Due to the longitudinal bowing of the contact clip 27, forces are applied by the contact ends 40 and 41 when snapped onto the contact 26, lead 37, and the connection conductor 28 that ensure the electrical connection to the contact 26. This can be seen in FIGS. 4 and 5 that show the contact clip 27 before installation on the contact 26, and FIGS. 6 and 7 that show the contact clip 27 after installation on the contact 26.

Figure 8:
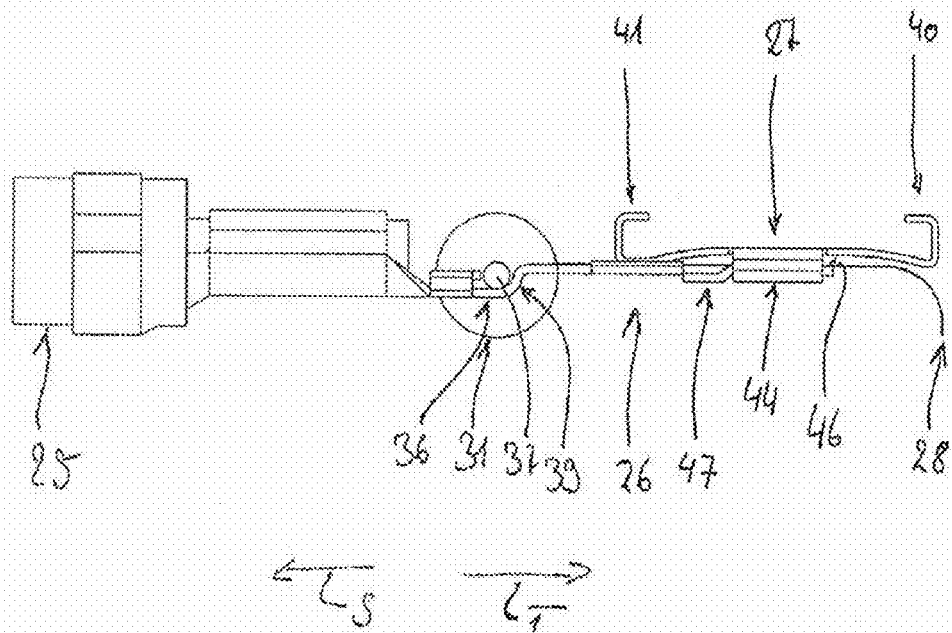
FIG. 8 is a side view of the connection region of the connecting and feed cables with a slide-on contact clip in the open position.
Figure 9:
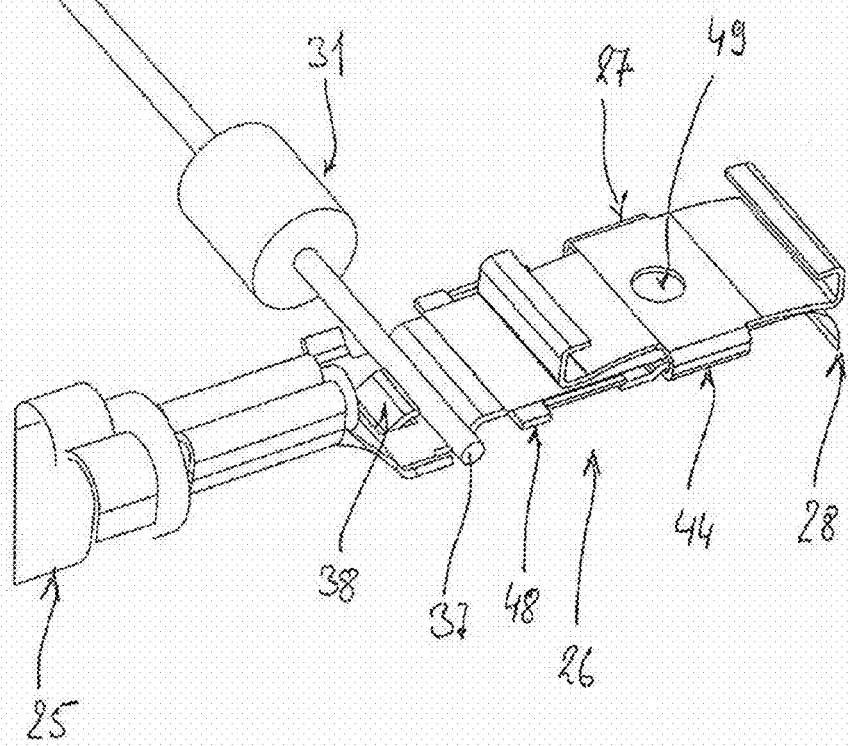
FIG. 9 is a perspective view of the connection region shown in FIG. 8.
Figure 10:
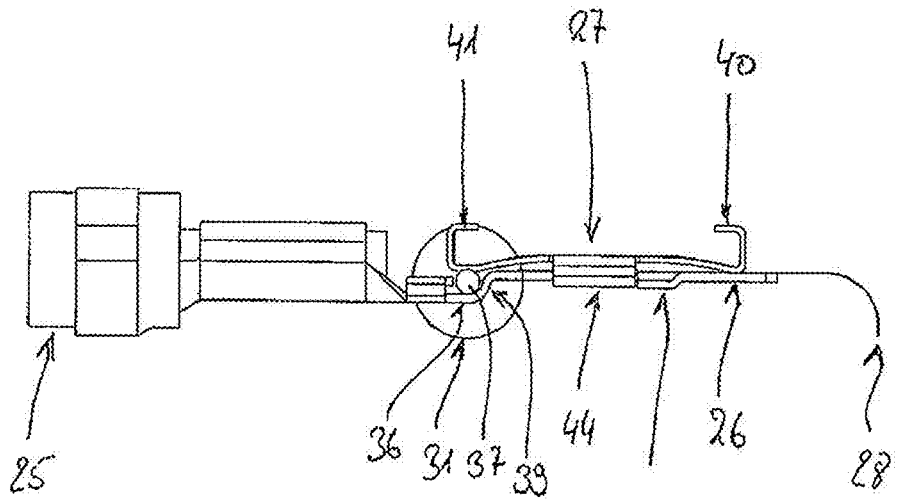
FIG. 10 is a side view of the connection region shown in FIG. 8 with the contact clip in the closed position.
Figure 11:
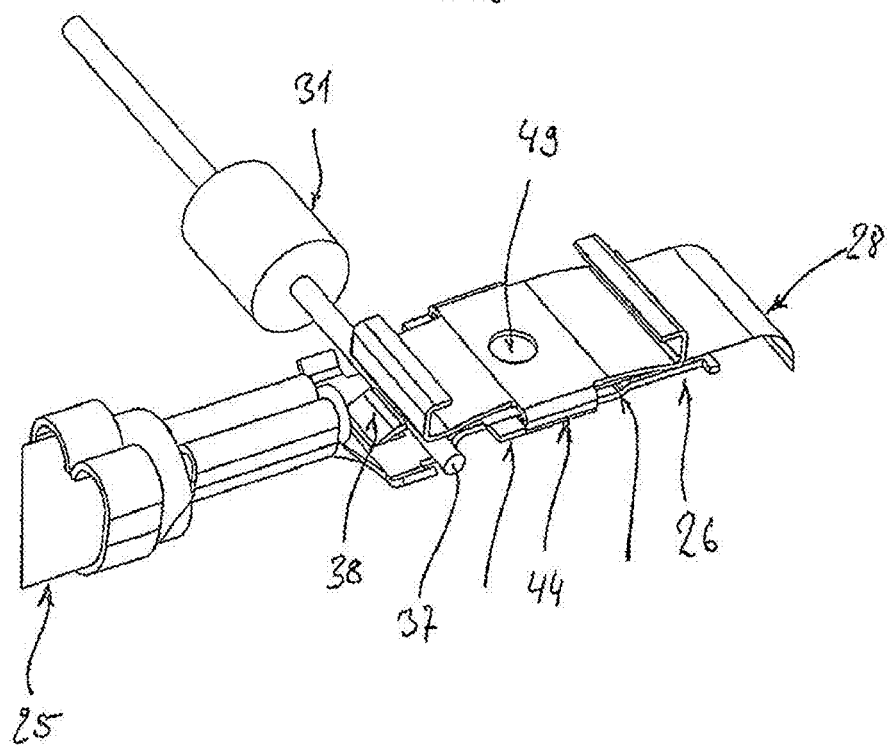
FIG. 11 is a perspective view of the connection region shown in FIG. 10.

FIGS. 8 through 11 show a second approach to making an electrical connection between the connection conductor 28 and the contact 26, on one side, and lead 37 of the bridge diode 31 and the contact 26 on the other side. In this embodiment, the contact clip 27 is slidable longitudinally on the contact 26. In FIGS. 8 and 9, the contact clip 27 is found in its open position in which the connection conductor 28 and lead 37 can be placed onto the contact 26. FIGS. 10 and 11 show the closed position of the slidable contact clip 27, which position makes the electrical connection.

The embodiment of FIGS. 8 through 11 differs from the previous example only in the design of the overlap region of the contact 26. Thus most of the structure is described above. The differences between the two embodiments and their effects are described below.

In the open position shown in FIGS. 8 and 9 for the contact clip 27, which is slidable in directions S and T, an insertion gap 46 is formed between the contact clip 27 and the end region of the contact 26 facing away from feed cable 25. The connection conductor 28 can be inserted into this gap between the contact clip 27 and the contact 26. In the open position, the groove-shaped seat 36 is furthermore open to receive the lead 37 of the bridge diode 31. The lead 37 is thus insertable into the seat 36.

Unlike the embodiment of FIGS. 4 through 7, the contact does not have any guide tabs 42. Instead, in its end region facing away from feed cable 25 the contact 26 has a pushed-out locking lug 47 directed away from the contact clip 27 and downward toward the floor 16. Near the feed cable 25, limit stops 48 are provided spaced apart relative to this cable. Between the locking lug 47 and the limit stops 48 is located the support region for the contact-side snap-in locking formations 44 in the closed position of the contact clip 27 shown in FIGS. 10 and 11.

In order to make an electrical connection between the lead 37 and the contact 26, as well as to the connection cable 38 and the contact 26, the contact clip 27 is moved in direction S into its closed position. The snap-in locking formations 44 here slide over the locking lug 47 into the support region, where the motion in direction S is restricted by the limit stops 48. After completing this motion in the direction S, the locking lug 47 prevents any motion in the opening direction T and locks the structure in the closed position. A tool can be used as required to effect sliding in direction S, to which end the contact clip has a tool-engagement formation 49. In the closed position, the contact ends 40 and 41, as described, secure the connection conductor 28 and the lead 37 on the contact 26.

I claim:

1. A box for connecting an output conductor of a solar panel with a conductor of a feed cable, the box comprising:
   a flat base mountable on the solar panel and having a first opening for the feed cable and a second opening for the output conductor;
   a contact mounted on the conductor of the feed cable and having a flat connection region extending parallel to the base; and
   a contact clip having a pair of arms that engage around the contact in the connection region, wherein the arms are spaced such that the contact can be slit between the arms for securing the solar-panel output conductor to the connection region.

2. The connection box defined in claim 1 wherein the contact has a seat for a lead of a circuit element.

3. The connection box defined in claim 2 wherein the contact clip overlies and presses the lead into the seat.

4. The connection box defined in claim 1 wherein the contact is conductive.

5. The connection box defined in claim 1 wherein the arms are elastically deflectable apart such that the contact can be snapped into place between the arms.

6. The connection box defined in claim 1 wherein the clip and contact are relatively slideable between an open position forming a gap into which the solar-panel output conductor can be inserted and a closed position in which the solar-panel output conductor in the gap is tightly gripped between the contact and the clip.

7. The connection box defined in claim 6 wherein the solar-panel output conductor is a flat conductive tape.

8. The connection box defined in claim 6 wherein the contact forms a seat for a lead of a circuit element and in the open position the seat is laterally open but in the closed position the clip covers the seat and presses the lead into the seat.

9. The connection box defined in claim 6 wherein the contact has stops against which the clip bears in the closed position.

10. The connection box defined in claim 9 wherein the contact has a deflectable locking lug that the clip passes over when moving from the open to the closed position and that engages behind the clip and locks it in the closed position when the clip engages the stops.

11. The connection box defined in claim 1 wherein the clip is bowed and is deformed when held by the arms against the contact.

* * * * *